INVENTORS
ROBERT W. NASHOLD
HERMAN J. BALDWIN
VINCENT L. MITCHELL

BY
Howard Heiser
John F. Verhoeven
ATTORNEYS

Aug. 27, 1963 — R. W. NASHOLD ET AL — 3,101,649
SPIRAL MILLING MACHINE
Filed Dec. 19, 1958 — 11 Sheets-Sheet 3

INVENTORS
ROBERT W. NASHOLD
HERMAN J. BALDWIN
VINCENT L. MITCHELL
BY
Howard Keiser
John F. Verhoeven
ATTORNEYS

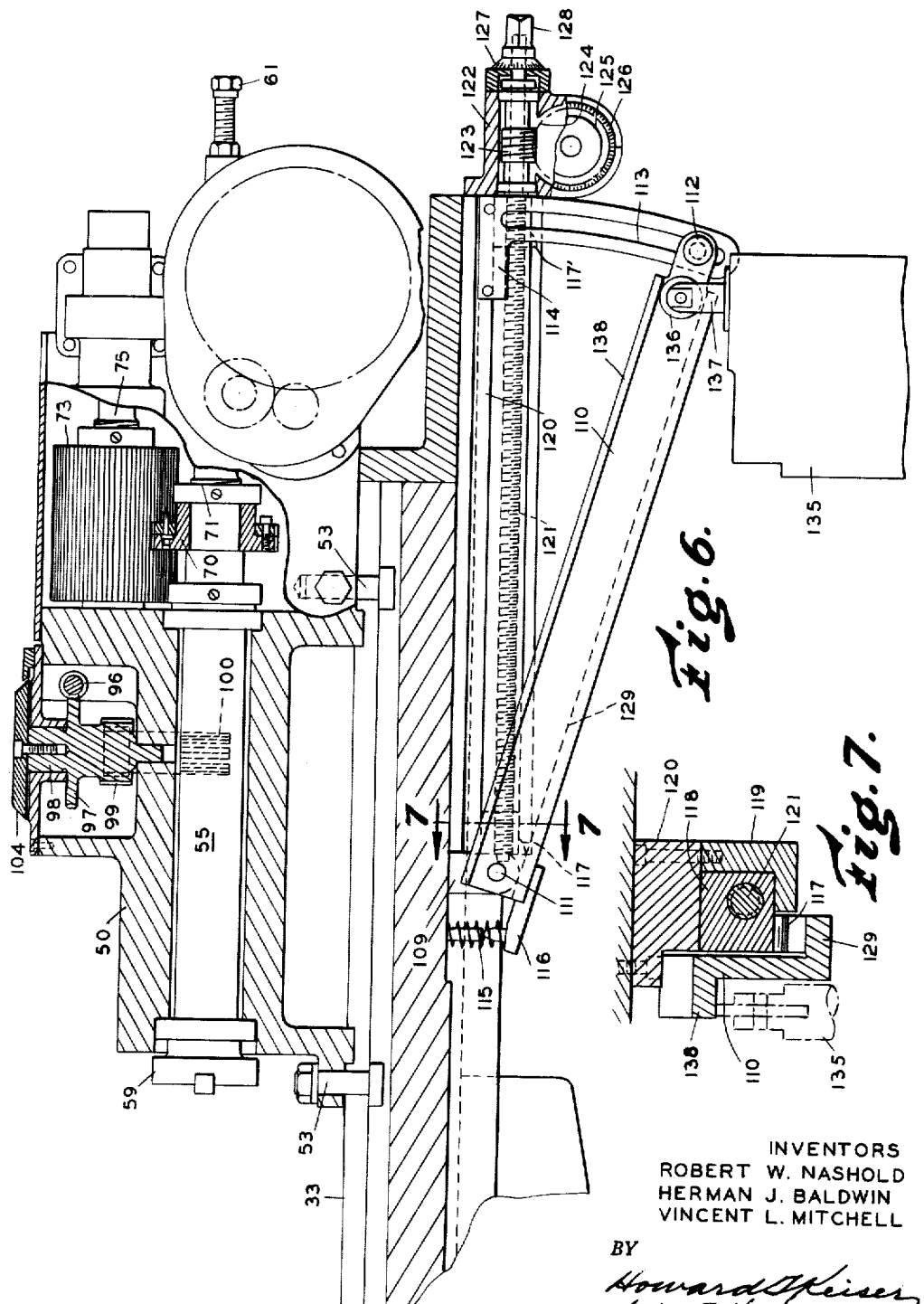

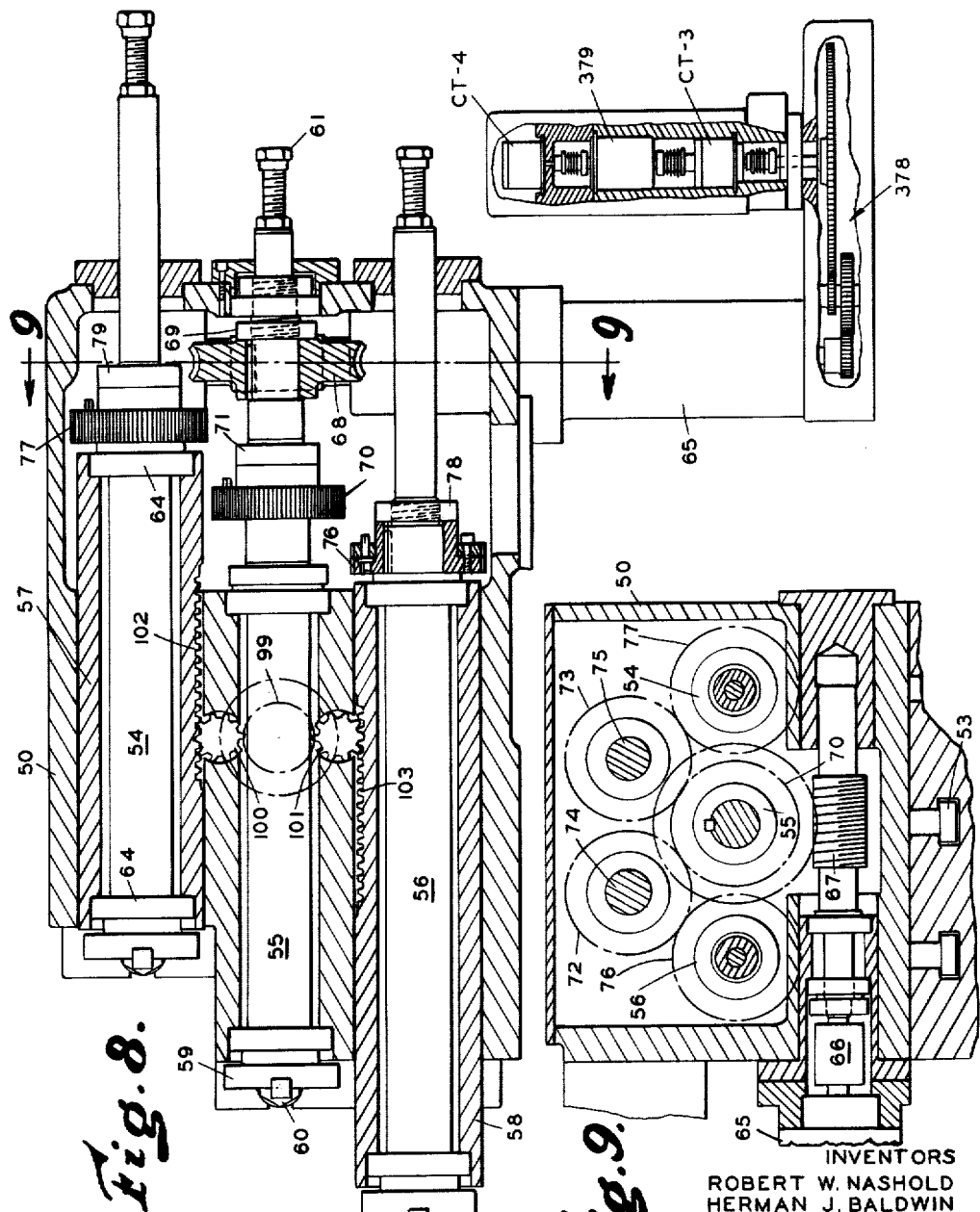

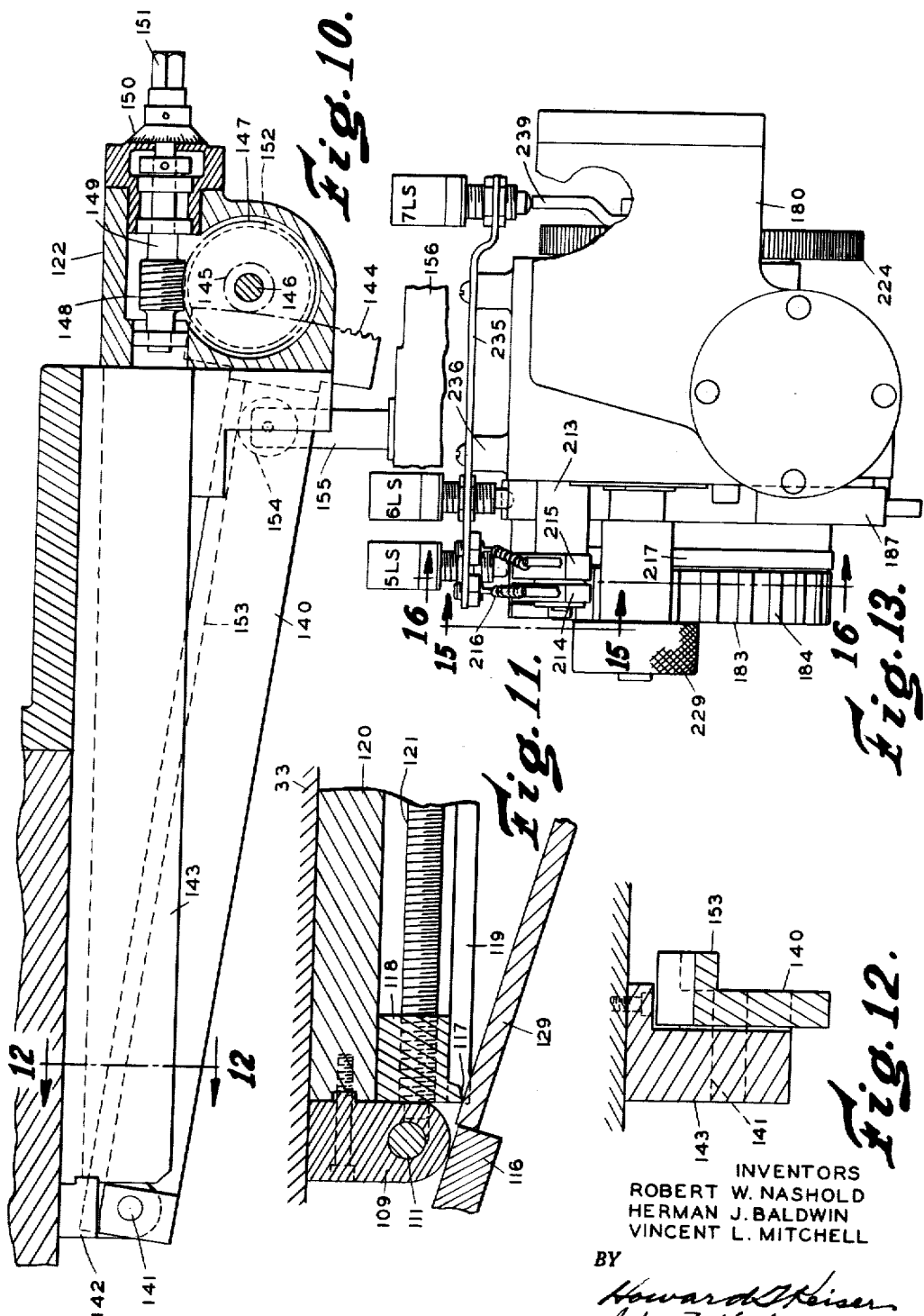

Aug. 27, 1963    R. W. NASHOLD ET AL    3,101,649
SPIRAL MILLING MACHINE
Filed Dec. 19, 1958    11 Sheets-Sheet 7
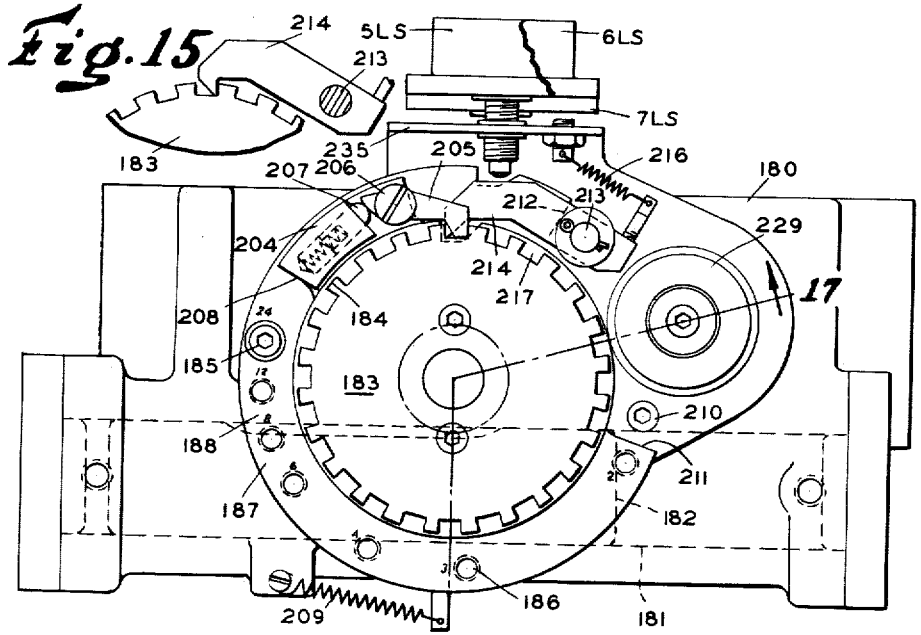
Fig.15.
Fig.14.
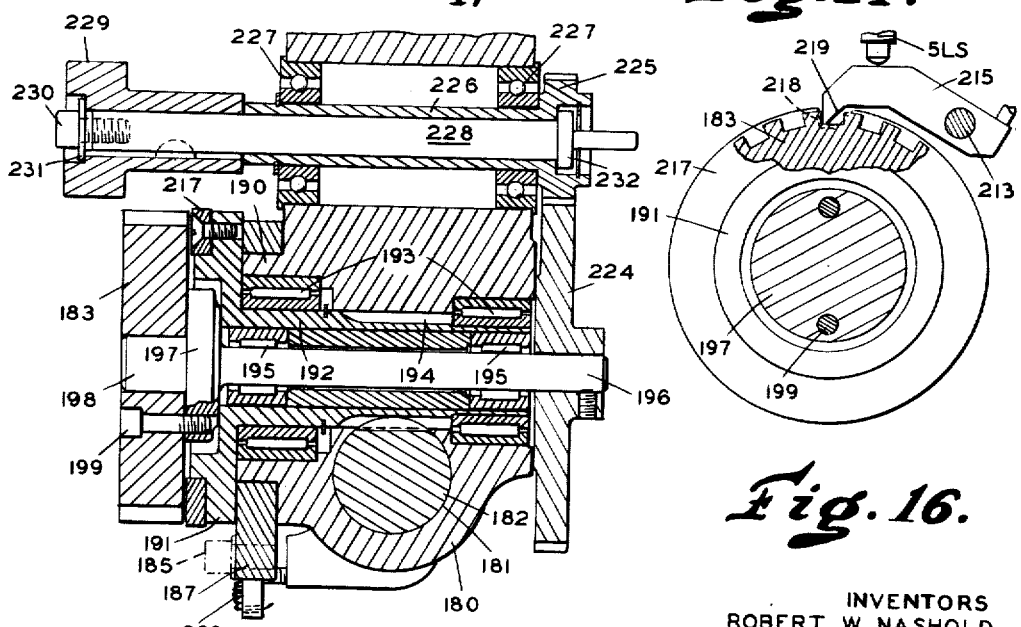
Fig.17.
Fig.16.
INVENTORS
ROBERT W. NASHOLD
HERMAN J. BALDWIN
VINCENT L. MITCHELL
BY
Howard L. Keiser
John F. Verhoeven
ATTORNEYS INVENTORS
ROBERT W. NASHOLD
HERMAN J. BALDWIN
VINCENT L. MITCHELL
BY
Howard T Keiser
John F. Verhoeven
ATTORNEYS

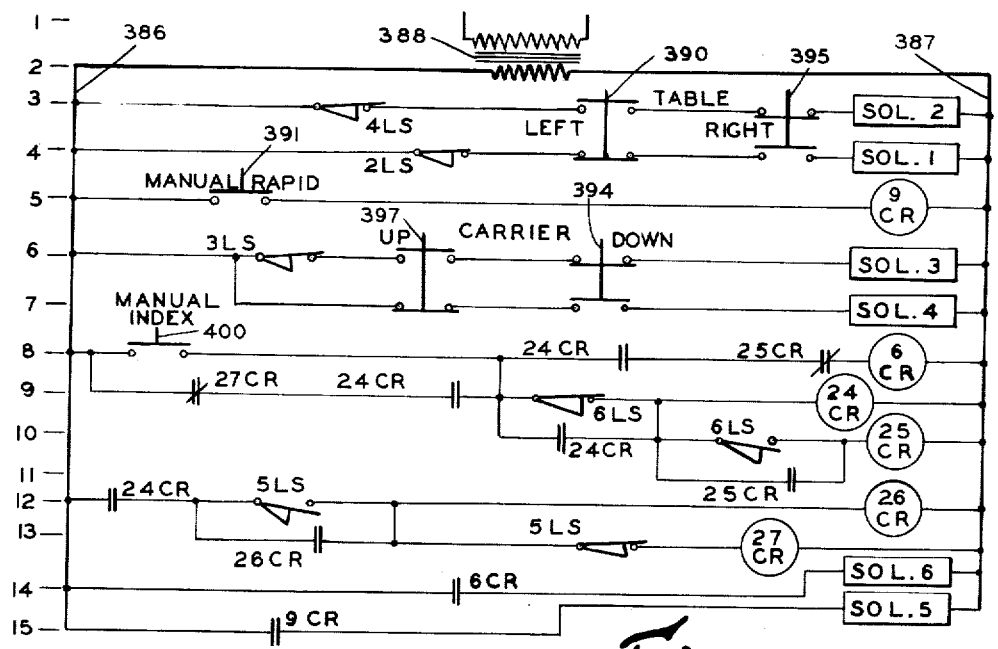
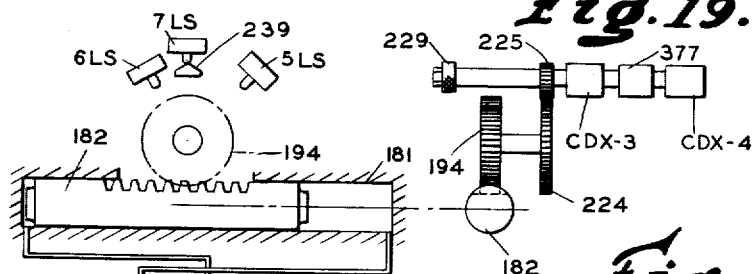
Fig. 19.
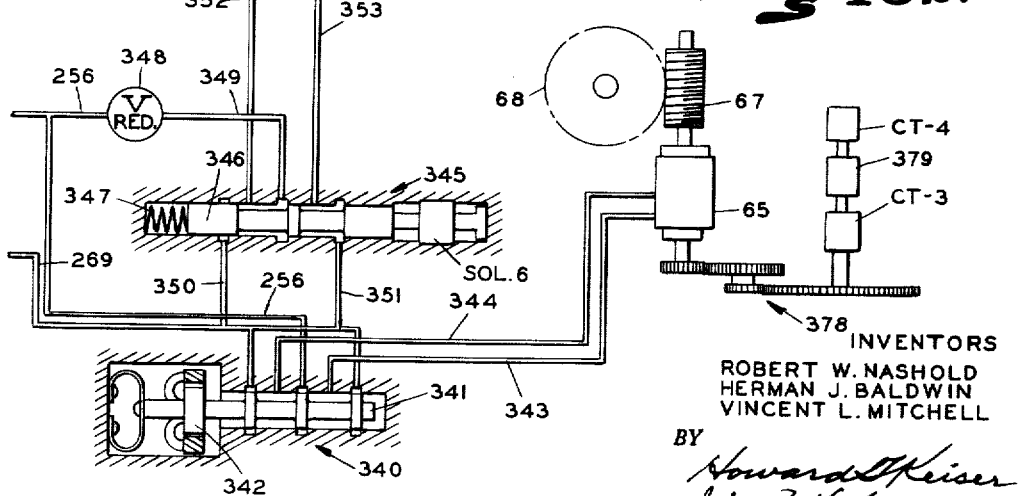
Fig. 18b.
INVENTORS
ROBERT W. NASHOLD
HERMAN J. BALDWIN
VINCENT L. MITCHELL
BY
Howard L Keiser
John F. Verhoeven
ATTORNEYS

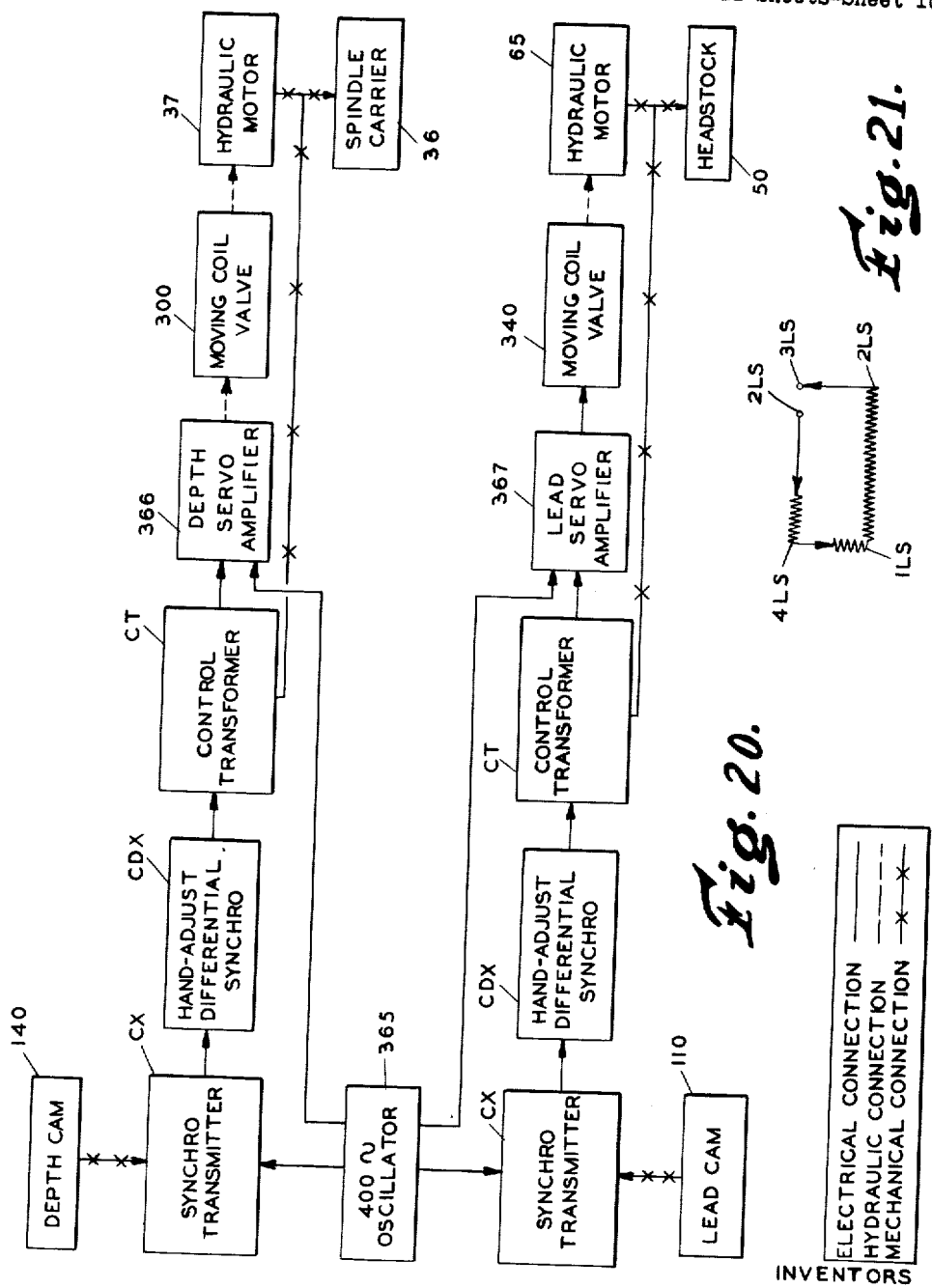

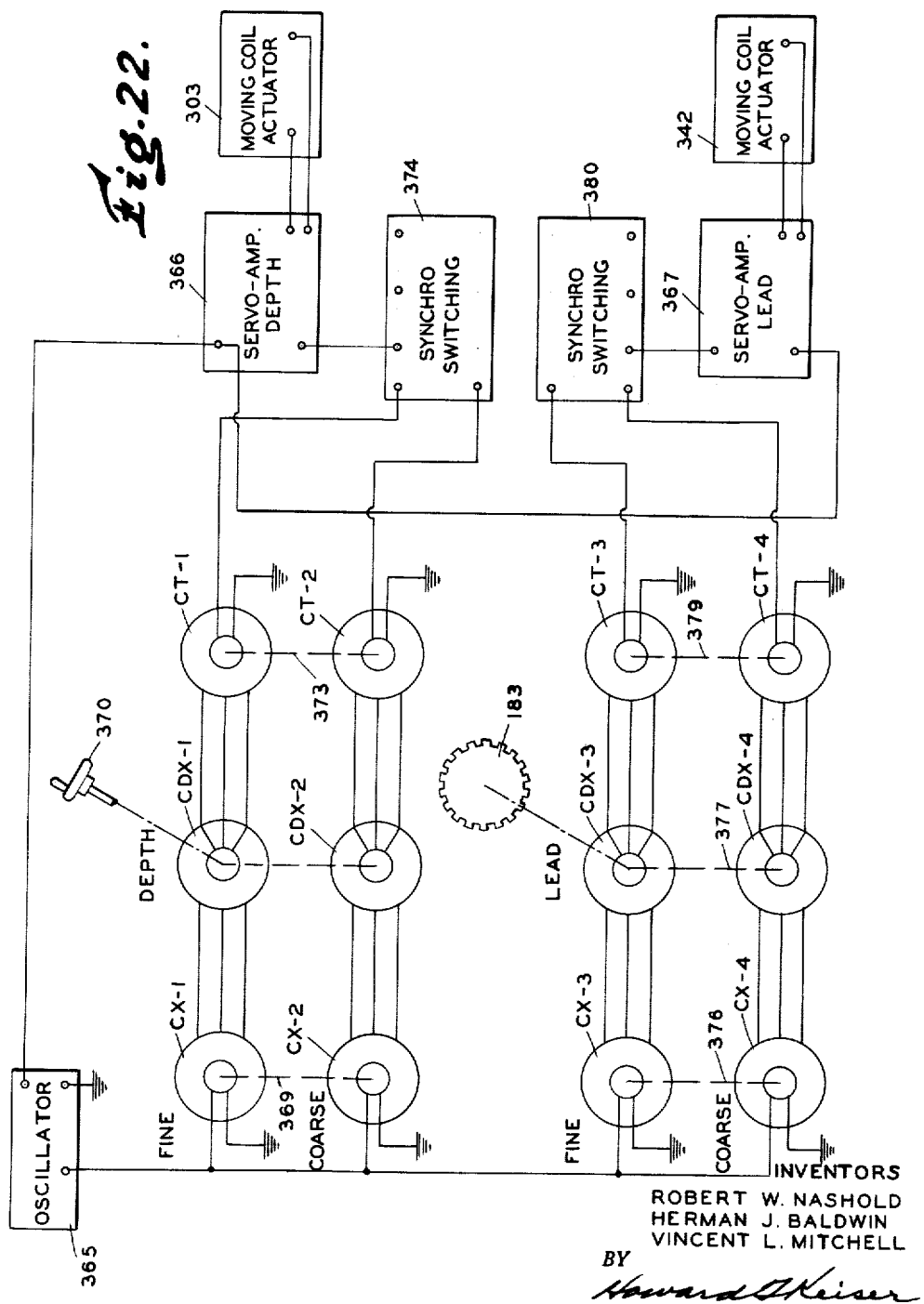

United States Patent Office 3,101,649
Patented Aug. 27, 1963

3,101,649
SPIRAL MILLING MACHINE
Robert W. Nashold, New Richmond, and Herman J. Baldwin and Vincent L. Mitchell, Cincinnati, Ohio, assignors to The Cincinnati Milling Machine Co., Cincinnati, Ohio, a corporation of Ohio
Filed Dec. 19, 1958, Ser. No. 781,747
9 Claims. (Cl. 90—11.5)

This invention relates to a machine for generating spiral flutes in the production of drills, reamers, counterbores, milling cutters and other parts requiring the formation of helical or spiral flutes. The present machine represents an advance over the prior art devices in that it is adapted for use with an automatic cycle control mechanism which enables completely automatic operation of the machine from the time that the unfinished parts are loaded into the work fixture until the finished parts are removed therefrom at the end of the machining operation. Provision is made for setting in a desired lead by means of a manipulable dial which, in turn, controls the inclination of a bar-type cam which is followed by a lead tracer. Provision is also made for controlling the taper of depth of the flutes along the length of the work, i.e., a manually settable dial controls the inclination of a depth cam which is similar to the lead cam and which is followed by a depth tracer.

The cutting tool is supported by a spindle carrier which is mounted for sliding movement on the bed of the machine. The helix angle of the flutes is determined by the angular setting of a saddle pivoted on the fixed bed of the machine. A work supporting table is guided for longitudinal sliding movement on the saddle and the work is supported for rotation about its longitudinal axis in a fixture carried by the table. The fixture is provided with one or more headstock spindles which are rotated under the control of the lead tracer to cause the work to be rotated in synchronism with the longitudinal movement of the table. Where more than one headstock spindle is utilized, provision is made for displacing the spindles axially in accordance with the helix angle of the flutes so as to align the starting positions of the flutes on each of the workpieces. By this means, each cutter will make contact with a corresponding point on each of the workpieces so that each cut will start and stop at the same place on each workpiece. The longitudinal displacement of the spindles is effected by a manually settable dial which simultaneously adjusts the headstock quills to the proper locations for the selected helix angle which is also applied to the table by means of the swiveling saddle.

After one flute has been cut in the work, an indexing device is rendered effective to rotate the work into position for cutting the next flute. A supplementary manual control is provided which enables the work to be rotated to the desired starting position for the first flute. Thereafter, the flutes will be properly spaced around the work by the indexing mechanism which can be set to cause a selected number of flutes to be cut around the circumference of the work.

As heretofore stated, the present machine is so designed that all of the flutes may be cut in the course of a fully automatic cycle thereby increasing the productive output of the machine and reducing the manual operations required to produce the finished parts. All of the necessary controls for a fully automated cycle are disclosed in co-pending application Serial No. 781,614, filed December 19, 1958, and entitled Programming Apparatus. In the present application, only the manual controls are shown and described since these are sufficient to afford a full understanding of the novel features disclosed and claimed herein.

Accordingly, it is an object of the present invention to provide a tracer controlled machine tool for cutting spiral flutes of varying leads and tapers on workpieces of varying shapes and sizes.

Another object of the invention is to provide direct reading dials for setting into the machine the lead and taper of the flutes to be cut in the workpieces.

Another object of the invention is to provide a direct reading dial for adjusting the displacement of the headstock spindles in accordance with the selected helix angle of the flutes which is also applied to the swivel saddle.

Another object of the invention is to provide an indexing mechanism which is capable of modifying the rotational position of the headstock spindles as determined by the lead tracer so as to index the work around to the next flute to be cut.

With these and other objects in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 6 is a cross sectional view taken along the line 6—6 in FIG. 3 to show the construction of the headstock and the dial mechanism for the lead cam.

FIG. 7 is a cross sectional view taken along the line 7—7 in FIG. 6.

FIG. 8 is a horizontal sectional view showing the adjusting means for the headstock spindles.

FIG. 9 is a cross sectional view taken along the line 9—9 in FIG. 8.

FIG. 10 is a cross sectional elevation showing the dial mechanism for adjusting the depth cam.

FIG. 11 is a detail view of the lead cam adjusting mechanism.

FIG. 12 is a cross sectional view taken along the line 12—12 in FIG. 10.

FIG. 13 is a side elevation of the indexing mechanism.

FIG. 14 is a front view of the indexing mechanism.

FIG. 15 is a fragmentary view of the indexing mechanism taken along the line 15—15 in FIG. 13.

FIG. 16 is a cross sectional view taken along the line 16—16 in FIG. 13 with parts broken away.

FIG. 17 is a cross sectional view taken along the line 17—17 in FIG. 14.

FIGS. 18a and 18b are diagrammatic views of the hydraulic circuit of the machine tool.

FIG. 19 is a wiring diagram.

FIG. 20 is a block diagram illustrating the lead and depth servomechanisms.

FIG. 21 is a diagrammatic view illustrating a typical flute milling cycle.

FIG. 22 is a block diagram illustrating the connections of the synchros employed in the lead and depth servomechanisms.

In the following description, similar reference characters are used to designate similar or identical elements and portions throughout the specification and throughout the different views of the drawings.

3

The invention is shown herein as applied to a fixed bed type milling machine which is especially suited to the automatic production of spiral fluted parts. It will be recognized, however, as the description proceeds, that the invention could be applied to other types of milling machines with equally satisfactory results.

Machine Tool Structure

Figure 1:
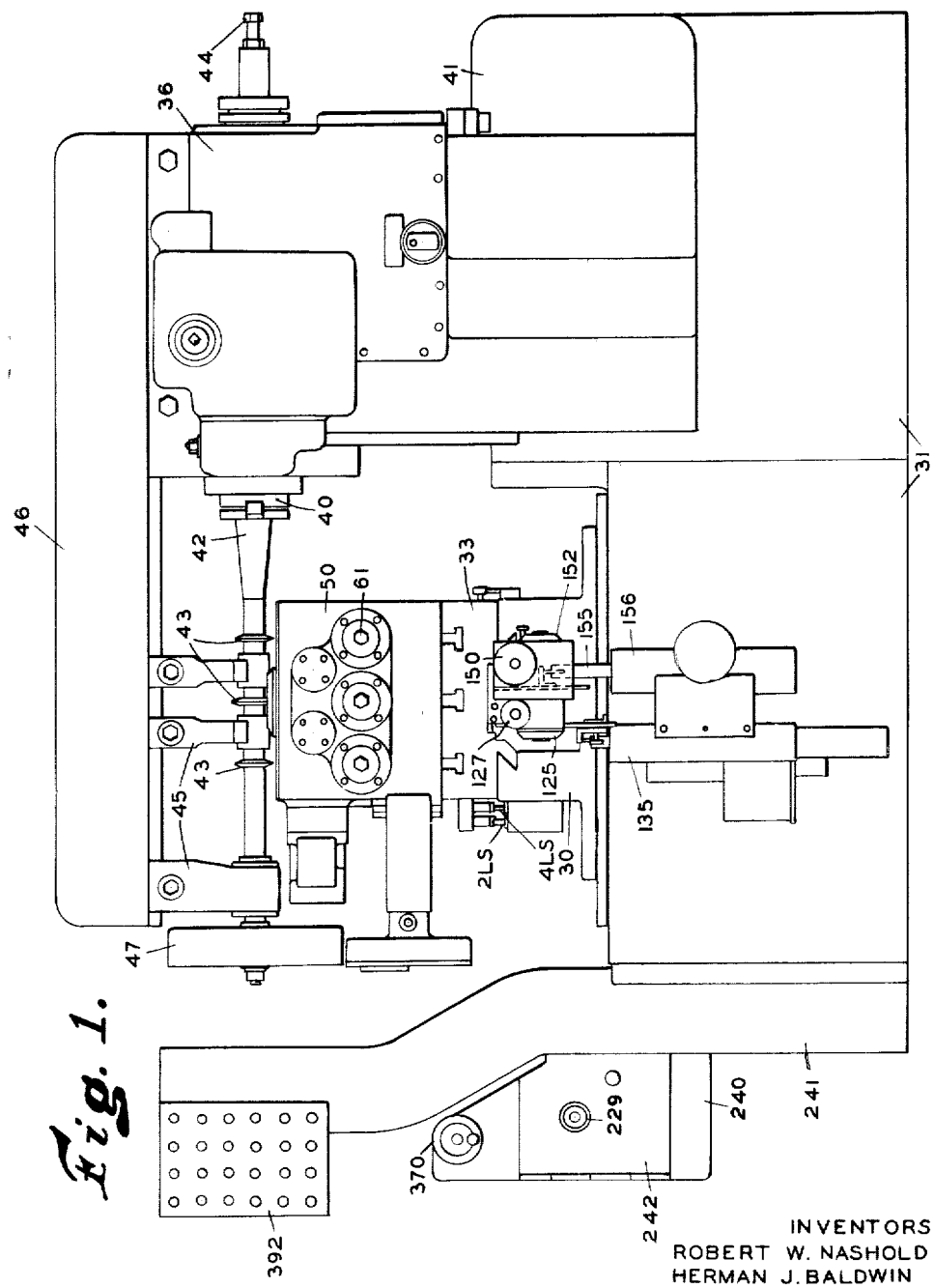
FIG. 1 is a right hand end view of a spiral milling machine constructed in accordance with the present invention.
Figure 2:
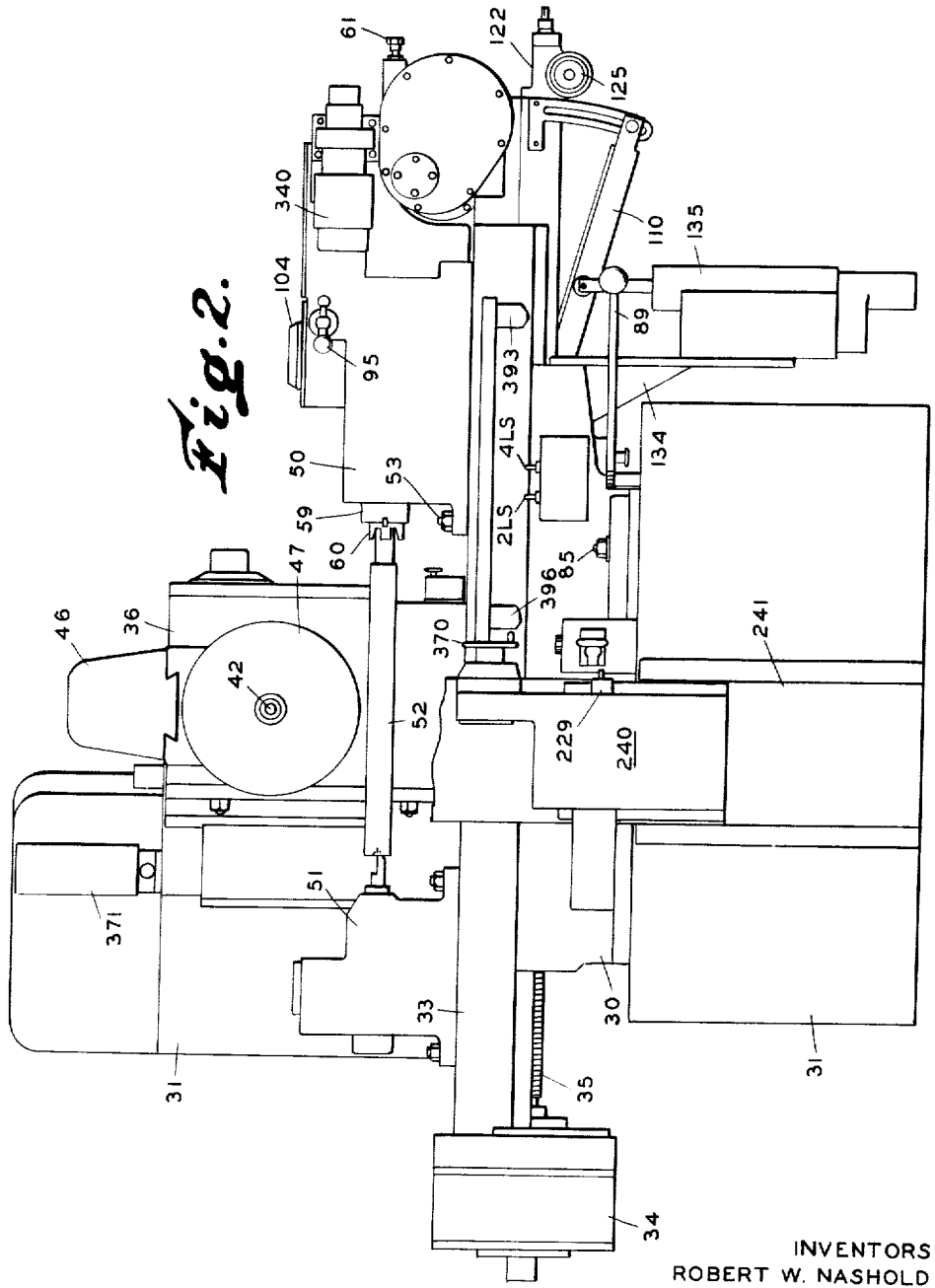
FIG. 2 is a front view of the machine shown in FIG. 1.
Figures 3, 4, 5:
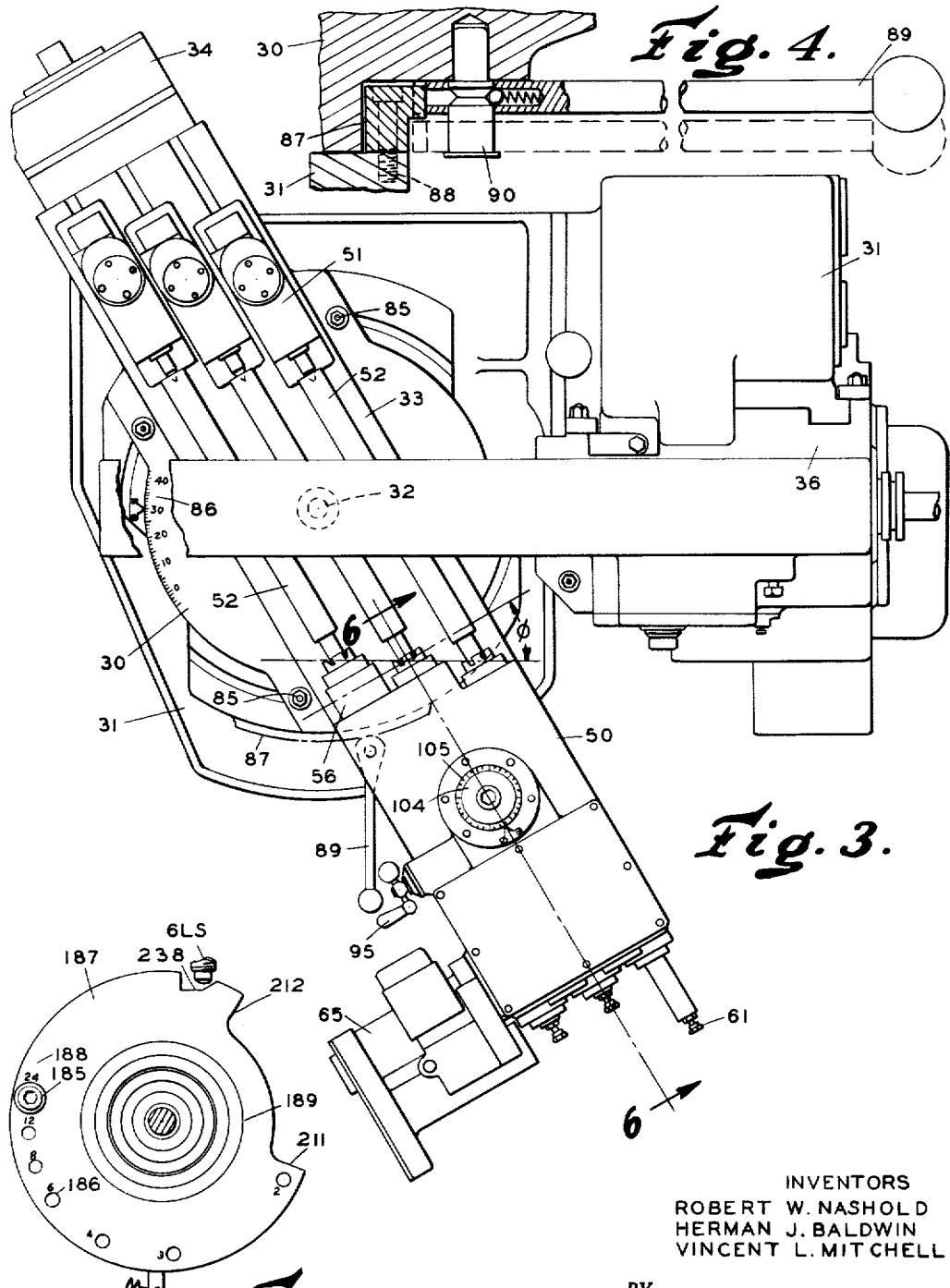
FIG. 3 is a plan view of the same machine.
FIG. 4 is a cross sectional view showing the hand lever for swiveling the saddle.
FIG. 5 is a detail view showing a portion of the indexing mechanism.

In FIGS. 1 to 4, inclusive, of the present drawings there is shown a fixed bed type production milling machine in which a saddle 30 is mounted for pivotal movement on the bed 31 by means of a pivot bolt or stud 32 (FIG. 3). The saddle is provided on its upper surface with dovetail ways for receiving and guiding a table 33 for rectilinear movement on the saddle. Traversing movement of the table on the saddle is effected by a hydraulic motor 34 mounted on the left hand end of the table as shown in FIG. 2. This motor drives a lead screw 35 which meshes with a nut fixed to the saddle whereby rotation of the feed screw will cause traversing movement of the table on the saddle.

The rear portion of the bed 31 is provided with an upstanding column on which a spindle carrier 36 is supported for vertical sliding movement by means of suitable ways provided on the bed. Movement of the spindle carrier along the ways is effected by means of a hydraulic cylinder 37 which is shown diagrammatically in FIG. 18a. As therein indicated, the cylinder is secured to the bed of the machine while a piston 38 working in the cylinder is connected by a piston rod 39 to the carrier 36 to raise and lower the carrier as hydraulic fluid is admitted to one end or the other of the cylinder 37.

Referring again to FIG. 1, the carrier 36 is fitted with a spindle 40 which is arranged to be driven by a motor 41 through a conventional transmission housed within the spindle carrier. An arbor 42, on which are mounted cutters 43, is attached to the spindle 40 and held securely therein by a drawbolt 44. The arbor 42 is supported along its length by arbor supports 45 which are mounted on an overarm 46 attached to the spindle carrier 36. A flywheel 47 may be mounted on the cutter end of the arbor 42 to smooth out the impulses resulting from contact of the individual teeth of cutters 43 with the work.

Work Fixture

The parts to be milled are supported on the table 33 by means of a work fixture shown in FIGS. 2, 3, 6, 8, and 9.

The workpieces 52 to be machined are supported between centers by a headstock 50 and tailstocks 51 to permit rotation of the work as the table is traversed along the saddle, and also to permit indexing of the workpieces after each flute has been cut therein. For this purpose the headstock, which is arranged to be secured by bolts 53 to the table 33 (FIG. 6), is fitted with as many spindles as there are workpieces to be machined on each operation of the machine tool. In the present embodiment of the invention, the machine is adapted to mill flutes in three workpieces 52 simultaneously and, accordingly, the headstock 50 is provided with 3 spindles 54, 55, and 56. As shown in FIG. 8, the center spindle 55 is journaled in the headstock frame without any provision for endwise shifting of this spindle. The spindles 54 and 56, however, are arranged for axial displacement and to this end are journaled in quills 57 and 58, respectively, which are in turn mounted for longitudinal sliding movement in the headstock. Each spindle is provided with a standard spindle nose 59 which supports a suitable work driver or chuck 60 for supporting one end of each of the workpieces and for driving the work as the spindle is rotated. Each spindle is preferably of hollow construction and provided with a drawbolt 61 for holding the work in the chuck.

As shown in FIG. 8, each spindle is journaled for rotation in bearings 64 and all of the spindles are arranged

4 to be rotated simultaneously in the same direction by a hydraulic motor 65 mounted on the side of the headstock. As shown in FIG. 9, the shaft of the hydraulic motor is connected through a coupling 66 with a worm 67 which is journaled for rotation in the headstock. The worm 67 meshes with a worm wheel 68 (FIG. 8) which is received on a reduced portion of the spindle 55. The worm wheel is connected to the spindle 55 by a key and is held in place by a nut 69 meshing with threads formed on the spindle. The spindle 55 also has keyed thereto a spur gear 70 which is held in place by a nut 71. As shown in FIGS. 6 and 9, the gear 70 meshes with a pair of wide faced idler gears 72 and 73 which are mounted on shafts 74 and 75 journaled for rotation in the headstock. The idler gears 72 and 73 in turn mesh with spur gears 76 and 77 which are keyed to the spindles 56 and 54, respectively, being held in place thereon by nuts 78 and 79. Accordingly, if the central spindle 55 is rotated clockwise as viewed in FIG. 9, the idler gears 72 and 73 will be rotated counterclockwise thereby rotating the spindles 54 and 56 clockwise. Since the gears 70, 76 and 77 are of the same pitch diameter, the spindles all will rotate at the same speed and effect synchronous rotation of the workpieces.

As mentioned earlier herein, the saddle 30 is arranged to be swiveled on the base 31 to permit a desired helix angle to be selected. Thus, by releasing bolts 85 (FIG. 3), the saddle may be swung about the pivot stud 32 to set in any desired helix angle from zero degrees to approximately 40 degrees as indicated by a scale 86 provided on the saddle. To assist the operator in adjusting the saddle to the desired angular position, a segmental rack 87 is secured to the bed of the machine by screws 88 as shown in FIG. 4. A hand lever 89 is pivotally supported on a stud 90 depending from the bottom of the saddle. The inner end of the lever 89 is formed with rack teeth adapted to mesh with the teeth of the rack 87. The hand lever is held in raised or meshing position, as shown in full lines in FIG. 4, by a spring pressed ball in the hand lever which cooperates with a detent groove in the stud 90. In this position of the hand lever, the teeth on the lever cooperate with the rack teeth 87 and by rotating the hand lever the saddle may be moved a short distance in either direction. By lowering the hand lever to disengage it from the rack teeth, as shown in the dotted outline position in FIG. 4, the lever may be then swung in the opposite direction and again raised to the full line position for engagement with the rack teeth to move the saddle a further increment in the desired direction. After the saddle has been accurately positioned as indicated by the scale 86, the bolts 85 may be tightened to clamp the saddle in the adjusted position.

In order to correctly align the workpieces with the cutters when the table is in an inclined position with respect to the arbor 42, it is necessary to displace the spindles 54 and 56 with respect to the center spindle 55 as indicated in FIG. 3. For this purpose the headstock is provided with a handcrank 95 which turns a worm 96 (FIG. 6) meshing with a worm wheel 97. The worm wheel is formed on a shaft 98 which is journaled at its upper and lower ends in the headstock frame. Also formed on the shaft 98 is a spur gear 99 which meshes with gear teeth formed on the upper ends of pinions 100 and 101 (FIG. 8). The lower ends of the pinions mesh with rack teeth 102 and 103 formed in the quills 57 and 58, respectively, whereby rotation of gear 99 will cause displacement of the quills in opposite directions. A dial 104 provided with graduations 105 (FIG. 3) is secured to the upper end of the shaft 98 to indicate the displacement of the quills. The scale 105 is desirably graduated in degrees from zero to approximately 40 degrees corresponding with the graduations on the saddle. Thereby, the dial 104 may be set by the handcrank 95 until the setting thereof corresponds to the degree setting of the scale 86 on the saddle. The quills 54 and 56 will then be displaced the proper distance to cause the cutters 43 to engage the workpieces 52 at corresponding longitudinal positions thereon so that the flutes will start at the same locations on each of the three workpieces. In FIG. 3, the saddle is shown set to a helix angle of 30 degrees and when the dial 104 is turned by the handcrank 95 to read 30 degrees on scale 105, the angle $\phi$ made by a line drawn through the chucks with a line drawn through the chuck of the center spindle and perpendicular to the axis of the spindle will likewise be 30 degrees.

Lead and Depth Cams

In FIGS. 6, 7, 10, 11 and 12 of the drawings is shown the mechanism for setting the lead and depth cams in accordance with the readings of the lead and depth dials in terms of inches of lead per revolution and degrees of taper.

As shown in FIG. 6, a lead cam 110 which is of Z-shaped configuration as shown in FIG. 7, is pivoted at 111 on a bracket 109 secured to a bar 120 (FIG. 11) fastened to the underside of the table 33. At its other end, the cam is provided with a thumb screw 112 which cooperates with an arcuate slot 113 provided in a bracket 114 attached to the bar 120. The cam 110 is counterbalanced by a compression spring 115 working between the bottom surface of the table and the top surface of an arm 116 secured to the pivot end of the cam. Angular adjustment of the cam is controlled by a nose 117 formed on the bottom of a block 118 (FIGS. 7 and 11) which is slidable along a guideway provided by an angular rail 119 secured to the bar 120. Movement of the block along the guideway is effected by a lead screw 121 which is journaled at its left hand end in a bearing provided in the bracket 109. At its right hand end the lead screw is journaled in bearings provided in a frame casting 122 attached to the right hand end of the bar 120. Within the frame casting 122 the lead screw has secured thereto a worm 123 which meshes with a worm wheel 124 to which is secured a dial 125. This dial is provided with graduations 126 which cooperate with an index to indicate the lead setting of the cam 110 in inches per revolution of the spindles. At its right hand end, the lead screw 121 has secured thereto a vernier dial 127 and a square shank 128 to which a wrench may be applied for rotating the lead screw. Hence, by rotating the lead screw, the block 118 may be moved along the guideway and the nose 117, in cooperation with the bottom flange 129 of the cam 110, will determine the inclination of the cam with respect to the table ways. In FIGS. 6 and 11, the block 118 is shown in its extreme left hand position which is the position of minimum lead which may, for example, be in the neighborhood of 2½ inches per revolution. This amount of lead is indicated by the dial 125 and vernier 127 when the block is in the position shown in these figures. As the block is moved to the right by rotation of the lead screw, the lead is gradually increased as indicated by the dial and vernier. After the correct lead has been set up on the dial 125 and vernier 127, the cam 110 is moved upward until the nose 117 contacts the bottom flange of the cam after which the thumb screw 112 is tightened to maintain the bar in this position. When the nose 117 is in the dotted line position 117' shown in FIG. 6, the bar 110 will be parallel with the table ways which corresponds with a lead setting of infinity.

As the table is traversed along the saddle, the cam 110 is followed by a tracer 135. As shown in FIG. 6, the tracer has a roller 136 supported on the upper end of a plunger 137 which is mounted for longitudinal sliding movement within the body of the tracer. The tracer 135 is mounted on a bracket 134 (FIG. 2) carried by the saddle so as to partake of the swiveling motion of the saddle while remaining stationary with respect to translational movements of the table. The roller 136 cooperates with the bottom surface of the upper flange 138 of the cam 110. Hence, as the table is fed along the saddle, the plunger 137 of the tracer will be moved in or out and thereby control the rotation of the hydraulic motor 65 which effects rotation of the spindles. The particular manner in which the tracer controls the rotation of the hydraulic motor will be described in a later portion of this specification.

The control of the taper to be produced in the flute is controlled by a similar cam and tracer mechanism as shown in FIGS. 10 and 12. As viewed from the front of the machine, the depth cam 140 lies directly behind the lead cam. The depth cam is pivoted at 141 on a bracket 142 which is secured at the left hand end of a bar 143 secured to the underside of the table. The cam 140 is provided at its right hand end with a rack segment 144 which meshes with a spur gear 145 secured to a shaft 146 which is journaled in the frame casting 122. Also secured to the shaft 146 for rotation with the gear 145 is a worm wheel 147 which meshes with a worm 148 secured to a shaft 149 which is journaled for rotation in the casting 122. The shaft 149 is provided at its right hand end with a vernier 150 and a square shank 151 to which a wrench may be applied for rotating the worm 148. A dial 152 bearing suitable graduations is also secured to the shaft 146 to provide an indication of the angular position of the depth cam 140 with respect to the table ways. The dial 152 lies on the opposite side of the frame casting 122 from the dial 125 for the lead cam and is graduated in degrees of taper which varies from zero, when the cam is parallel to the table ways, to a maximum when the cam is in its lowermost position. The cam 140 is provided with a flange 153 which is followed by a roller 154 mounted on the upper end of a plunger 155 which is supported for longitudinal sliding movement within the housing of a depth tracer 156 mounted on the bracket 134. This tracer, in a manner hereinafter to be described, controls the movement of the spindle carrier to thereby control the depth of cut effected by the cutters 43 in the workpieces 52.

Indexing Mechanism

The mechanism for indexing the headstock spindles is shown in FIGS. 5 and 13–17, inclusive. As therein shown, the mechanism includes a frame casting 180 provided with a cylindrical bore 181 containing a rack piston 182 which serves to operate the indexing mechanism. The mechanism also includes an indexing disc 183 which contains twenty-four square teeth 184 spaced around its periphery. Each revolution of the disc 183 corresponds to one revolution of the headstock spindles. Hence, each time the disc is advanced a distance of one tooth, the spindles will be rotated one 24th of a revolution. The maximum number of flutes which can be cut under the control of the indexing mechanism is, therefore, twenty-four flutes. By advancing the disc 183 two teeth at a time, twelve flutes may be cut; an advance of three teeth will produce eight flutes; four teeth will provide six flutes; a six tooth advance will give four flutes; an eight tooth advance will provide three flutes, and a twelve tooth advance will result in two flutes. The extent to which the disc is advanced on each operation of the indexing mechanism is determined by the position of a screw stud 185 which may be screwed into any one of seven tapped holes 186 provided in a stop plate 187 (FIG. 5). The small numerals 188 (FIGS. 5 and 14) inscribed adjacent each hole 186 indicate the number of flutes which will be indexed with the screw stud 185 placed in that hole.

The stop plate 187 is provided with a large central aperture 189 which fits over a cylindrical boss 190 (FIG. 17) machined on the frame casting 180. The stop plate is held in place on the boss 190 by a flange 191 formed on one end of a pinion sleeve 192. This sleeve is journaled in bearings 193 which are supported in a cylindrical bore provided in the frame casting 180. The sleeve 192 is provided with gear teeth 194 which mesh with the teeth of rack piston 182 as shown in FIG. 17. Journaled within the sleeve 192 by means of bearings 195 is a shaft 196, which, at its forward end, is provided with a flange 197 and a tenon 198. The indexing disc 183 is provided with a center hole which fits over the tenon 198 and the disc is held against the flange 197 by screws 199 (FIG. 17).

The flange 191 on the pinion sleeve 192 carries a block 204 (FIG. 14) which overlies the indexing disc 183. A driving pawl 205 is pivotally supported on the block 204 by means of a screw 206. The pawl is urged into engagement with the teeth 184 by a spring pressed plunger 207 mounted in the block 204. The block is provided with an abutment face 208 which is adapted to engage the screw stud 185 and thereby rock the stop plate 187 counterclockwise against the bias of a spring 209. Counterclockwise movement of the plate is limited by a stop screw 210 mounted in the frame casting and lying in the path of a shoulder 211 formed on the stop plate. The plate is provided with a second shoulder 212 (FIGS. 5 and 14) which is adapted to engage against a frame stud 213 on which a pair of pawls 214 and 215 are pivoted. The shoulder 212 thus limits clockwise rotation of the stop plate on the boss 190 under the influence of spring 209.

The pawl 214 (FIG. 15) is a holding pawl which prevents counterclockwise rotation of the indexing disc when the driving pawl 205 ratchets over the teeth 184 on the counterclockwise or cocking stroke of the mechanism. The pawl 215 (FIG. 16) is a positioning pawl which stops the disc 183 at the end of the clockwise or indexing stroke. The pawls 214 and 215 are urged into engagement with the teeth of the disc by springs 216. The pawl 215 lies partly over the disc 183 and partly over a mask 217 (FIG. 13) which is secured to the flange 191 of the pinion sleeve 192 (FIG. 17). The mask is provided with a cam notch 218 (FIG. 16) which cooperates with a sloping face 219 on the pawl 215 and thereby lifts the pawl out of the teeth of the disc when the pinion sleeve 192 is rotated counterclockwise on the cocking stroke. The pawl is held disengaged by the peripheral surface of the mask 217 until the end of the clockwise indexing stroke when the pawl again enters the cam notch 218 and stops further clockwise rotation of the indexing disc.

Secured to the rear end of the shaft 196 (FIG. 17) is a gear 224 which meshes with a smaller gear 225 formed on the end of a sleeve 226 which is journaled in a bore in the frame casting 180 by bearings 227. Mounted for rotation within the sleeve 226 is a synchro drive shaft 228 to which is keyed a knurled knob 229. The end of the shaft adjacent the knob is tapped to receive a screw 230 which, when tightened, presses a washer 231 against the bottom of a counterbore formed in the end of the knob. The other end of the shaft 228 is provided with a flange 232 which bears against the bottom of a counterbore provided in the gear 225. Thereby, when screw 230 is tightened, the knob 229 and sleeve 226 are clamped together and caused to rotate as a unit by reason of frictional engagement between the end of the knob 229 and the end of the sleeve 226. Thus, rotation of the gear 225 by gear 224 will cause rotation of the synchro drive shaft 228. However, by loosening the screw 230 it is possible to rotate the shaft 228 independently of the gears 224 and 225 and thus adjust the starting position of the headstock spindles with the index mechanism in its home position as shown in FIG. 14.

Associated with the indexing mechanism are three limit switches 5LS, 6LS and 7LS which are supported on a mounting plate 235 secured to bosses 236 (FIG. 13) formed on the frame casting 180. The limit switch 5LS is disposed with its operating plunger overlying the pawl 215 as shown in FIGS. 13 and 16. Thus, when the pinion sleeve 192 is rotated counterclockwise (FIG. 14) on the cocking stroke, the mask 217 will lift the pawl 215 and hold the limit switch 5LS operated until the end of the clockwise indexing stroke when the pawl reenters the notch in the mask. The limit switch 6LS is positioned in alignment with the stop plate 187 with its plunger received in a camming notch 238 (FIG. 5) formed in the plate. Hence, when the plate is rotated counterclockwise at the end of the cocking stroke, the cam surface of the notch will momentarily operate the switch 6LS. The limit switch 7LS is located above a single lobe cam 239 (FIG. 13) secured to the face of the gear 224, the cam being effective to hold the switch operated when the indexing mechanism is in its home position. When the indexing mechanism is operated at the end of the first sub-cycle, i.e., after the first flute has been cut in the workpieces, the limit switch 7LS will be released and will not again be operated until the end of machining operation, i.e., after all of the flutes have been cut.

The indexing mechanism operates as follows: When the rack piston 182 is moved to the right as viewed in FIG. 14, the drive pawl 205 will be rotated counterclockwise and ratchet over the teeth 184 of the indexing disc 183. The disc will be held against counterclockwise rotation by the holding pawl 214 (FIG. 15) and the positioning pawl 215 (FIG. 16) will be cammed out of engagement with the teeth by the mask 217. When the abutment face 208 on the block 204 contacts the screw stud 185, the stop plate 187 will be rocked counterclockwise to move the shoulder 211 into engagement with the screw stud 210. Further rotation of the driving pawl 205 is thereby prevented and a signal is provided by the limit switch 6LS to return the rack piston 182 toward the left as viewed in FIG. 14. On the return stroke of the piston, the driving pawl 205 will turn the disc 183 clockwise until the pawl reaches the position shown in FIG. 14 when the notch 218 (FIG. 16) in the mask will permit the positioning pawl 215 to drop into engagement with a tooth on the indexing disc and thereby positively stop the disc and hold it in the position shown in FIG. 14. The accuracy of the indexing operation is thereby determined by the accuracy with which the faces of the teeth 184 facing the end of the pawl 215 are formed. Since the spacing between the faces of adjacent teeth can be machined with a high degree of accuracy, the indexing of the headstock spindles can likewise be made very accurate.

The indexing mechanism may be located in any convenient position on the machine and, in the preferred embodiment, is mounted within a housing 240 (FIG. 1) which is secured to the outboard brace 241 of the machine. Access to the indexing mechanism is provided by a hinged door 242 which is apertured to permit the manual adjustment knob 229 to project therethrough so as to be readily accessible to the operator.

Hydraulic System

Figure 18A:
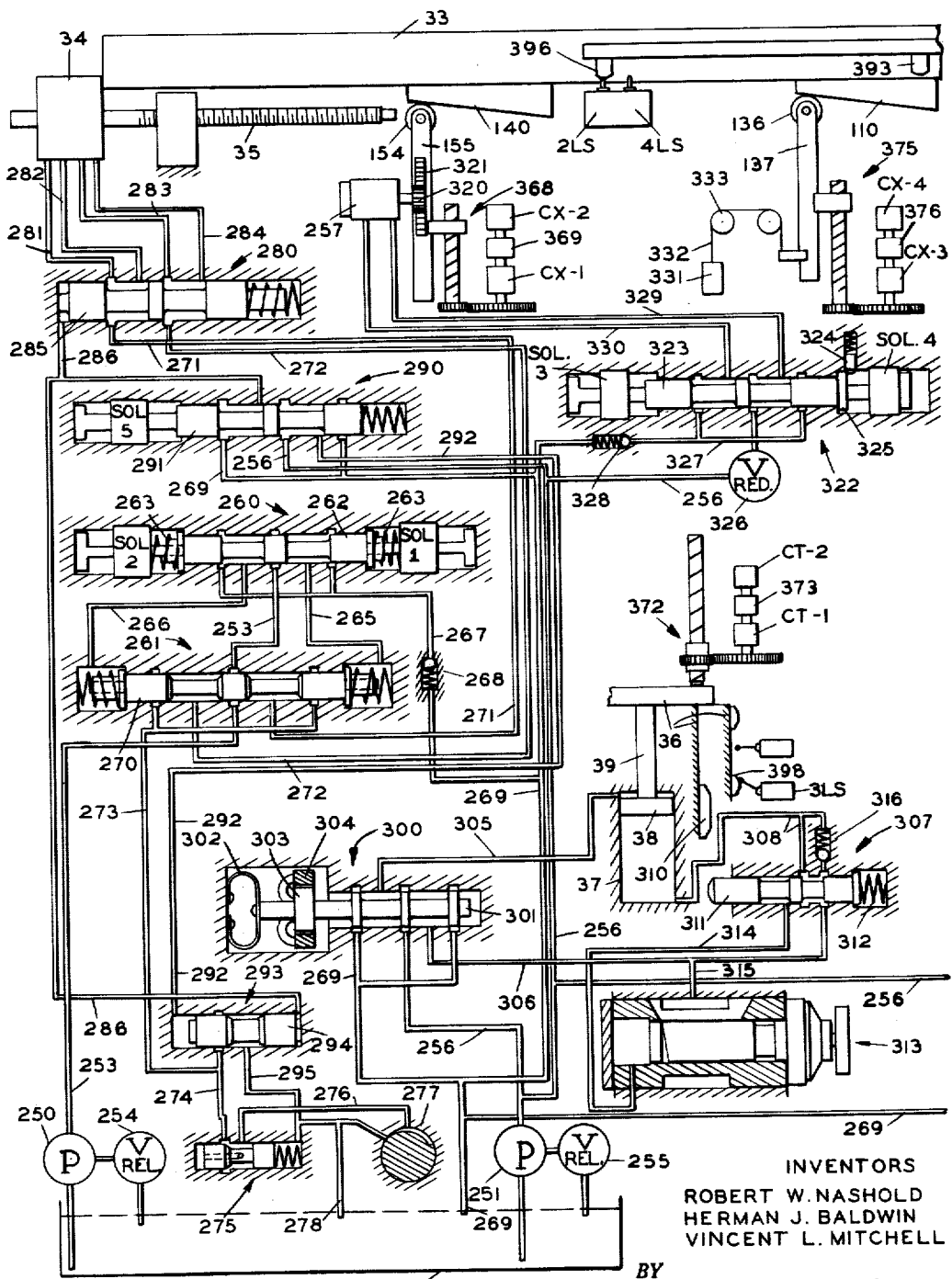

The portions of the hydraulic circuit which are necessary for an understanding of the present invention are shown in FIGS. 18a and 18b. Hydraulic fluid under pressure is supplied to the system by a pair of pumps 250 and 251 which are driven by suitable motors connected thereto (not shown). The pump 250 withdraws fluid from a reservoir 252 and delivers it to a high pressure line 253 whence it is delivered through suitable control valves to the hydraulic motor 34 which effects traversing movements of the table 33 by means of lead screw 35 as previously described. The fluid in line 253 is maintained at a predetermined constant pressure by means of a relief valve 254 which exhausts excess fluid into the reservoir 252.

The pump 251, like the pump 250, withdraws fluid from the reservoir 252 and delivers it, at a presure determined by the setting of a relief valve 255, to a pressure line 256. From this line it is delivered through suitable control valves to the hydraulic cylinder 37 for operating the spindle carrier, to the hydraulic motor 65 (FIG. 18b) for operating the headstock spindles, and to a hydraulic motor 257 (FIG. 18a) which operates the depth tracer.

Operation of the table motor 34 is controlled by a solenoid operated pilot valve 260 which in turn controls a reversing valve 261 for the motor 34. The pilot valve 260 is provided with a spool 262 which is normally held in a centered position as shown in FIG. 18a by centering springs 263. The spool may be shifted from the central position in one direction or the other by selective energization of solenoids SOL1 and SOL2. Right hand movement of the table is controlled by SOL1 and, when this solenoid is energized, the valve plunger 262 will be shifted to the left as viewed in FIG. 18a thereby connecting the pressure line 253 with a pilot line 265 which is connected to the right hand end of the reversing valve 261. At the same time, a pilot line 266 which is connected to the left hand end of valve 261 will be placed in communication with an exhaust line 267 which is connected through a check valve 268 with a main exhaust line 269 which connects with the reservoir 252. When pressure is thus applied to the right hand end of reversing valve 261, its plunger 270 will be shifted to the left thereby connecting the pressure line 253 with a motor line 271. At the same time a motor line 272 will be connected to an exhaust line 273 which is connected through a line 274 with the inlet port of a pressure regulating valve 275. The discharge port of valve 275 is connected by a line 276 with the inlet port of a rate valve 277 which meters the flow of fluid into a discharge line 278 emptying into the reservoir 252.

When pressure is applied to motor line 271 and motor line 272 is connected to exhaust through the pressure regulating and rate valves 275 and 277, the motor 34 will be operated in a direction to move the table 33 to the right. If table movement to the left is desired, the solenoid EOL2 is energized thereby shifting the plunger 262 to the right to connect pilot line 266 to the pressure line 253 and pilot line 265 to the exhaust line 269. Pressure will thus be applied to the left hand end of the plunger 270 of the reversing valve 261 and the plunger will be shifted to the right thereby connecting the pressure line 253 to the motor line 272 while the discharge line 273 will be connected with motor line 271. This will cause reversal of the hydraulic motor 34 and cause the table 33 to be moved to the left.

The motor lines 271 and 272 are communicatively connected to the motor 34 through a high speed-low speed valve 280. When the valve is in the position shown in FIG. 18a, the motor line 271 will be in communication with lines 281 and 282 leading to the motor 34 while the motor line 272 will be in communication with lines 283 and 284 running to the motor. The construction of the motor 34 is such that when hydraulic fluid is delivered to the motor and exhausted therefrom through the dual lines 281, 282, and 283, 284 the motor will operate at high capacity and low speed. However, when pressure is applied to the left hand end of plunger 285 of valve 280 by pilot pressure applied through a line 286, the plunger will be moved to the right and lines 282 and 284 will be blocked by the valve while lines 281 and 283 will remain communicatively connected with motor lines 271 and 272, respectively, by annular grooves provided in the valve body for this purpose. Under these conditions, hydraulic fluid will now be delivered to the motor and exhausted therefrom through the single lines 281 and 283 thereby causing the motor to operate at low capacity and high speed.

Rapid traverse of the table is controlled by a solenoid operated valve 290. This valve is fitted with a spool 291 which, in the position shown, communicatively connects the pressure line 256 with a pilot line 292 which is connected to the left hand end of a hydraulically operated bypass valve 293. At the same time, the pilot line 286 which is connected to the right hand end of the bypass valve 293 will be connected by the valve 290 with the main exhaust line 269. Thereby, a spool 294 of the bypass valve will be maintained in its right hand position as shown in FIG. 18a so as to compel return fluid from the motor 34 to pass through the pressure regulating valve 275 and rate valve 277. However, when a solenoid SOL5 is energized thereby shifting the spool 291 of the rapid traverse valve to the right, pressure from line 256 will be supplied to pilot line 286 while the pilot line 292 will be connected to the exhaust line 269. Thereby, pressure will be applied to the right hand end of bypass valve 294 while the left hand end of the valve will be connected to exhaust. Hence the spool 294 of the valve will be shifted to the left thereby connecting the line 274 with a bypass line 295 which is connected to reservoir through line 278. The rate valve 277 will thereby be bypassed, and return flow from the motor 34 will pass unrestricted to the reservoir. At the same time, the high speed-low speed valve 280 will be shifted to the right so as to block the lines 282 and 284 and cause the motor 34 to operate at low capacity and high speed. The direction of travel of the table in rapid traverse will be controlled, as before, by the pilot valve 260, movement to the right being effected by energization of solenoid SOL1 and movement to the left being effected by energization of solenoid SOL2.

The flow of hydraulic fluid to and from the carrier motor cylinder 37 is controlled by an electromagnetically operated valve 300. This valve is fitted with a spool 301 which is normally held in a centered position as shown in FIG. 18a by a bow spring 302. The spool 301 may be shifted in one direction or the other in accordance with the magnitude and direction of flow of energizing current through a coil 303 mounted on the left hand end of the spool. The coil is situated in a magnetic field provided by a permanent magnet 304 so as to produce a force on the coil when the latter is energized. The valve 300 is provided with a central pressure port to which the pressure line 256 is connected, exhaust ports to which the exhaust line 269 is connected, and intermediate ports to which motor lines 305 and 306 are connected. The motor line 305 is connected to the upper end of the cylinder 37, while the motor line 306 is connected through a mechanically operated bypass valve 307 to a line 308 connected with the bottom of the cylinder 37. The movement of the spindle carrier is thereby controlled in accordance with the energization of the moving coil 303 of valve 300, this valve forming one element of a servomechanism which will be described in a later portion of this description.

Mounted on the spindle carrier 36 is a dog 310 which is adapted to engage the end of spool 311 of the bypass valve 307 and cam the spool to the right against the urgency of a spring 312 as the carrier approaches the bottom of its downward stroke. When the spool is shifted to the right, the line 308 will be disconnected from direct communication with the motor line 306 and a rate valve 313 will be introduced into the circuit. Thus, the line 308 will be connected to a line 314 which connects with the inlet port of rate valve 313. The discharge port of the rate valve is connected by line 315 with the motor line 306 from whence the return fluid from the cylinder 37 passes through the valve 300 and into the exhaust line 269. Thus the feed rate of the carrier toward the work will be reduced in accordance with the setting of the rate valve 313 as the milling cutters move into contact with the workpieces. When the spindle carrier is to be elevated so as to remove the cutters from the workpieces, fluid under pressure from line 256 may flow through the motor line 306 and thence through the valve 307 and a check valve 316 into the bottom of cylinder 37. Hence, the bypass valve is effective only during downward movement of the carrier and will not enforce flow of fluid through the rate valve 313 during upward movement of the carrier even though the dog 310 holds the spool 311 in its right hand position. The spindle carrier may therefore move rapidly to its raised position.

Movement of the tracer roller 154 into contact with the depth cam 140 is controlled by hydraulic motor 257. As shown in FIG. 18a, the motor is operatively connected with the plunger 155 of the tracer by a pinion 320 on the motor shaft which meshes with a rack 321 on the plunger. Operation of the motor 257 is controlled by solenoid operated valve 322 having a spool 323 which is adapted to be operated in one direction or the other by solenoids SOL3 and SOL4. The valve spool is detented in either of its moved positions by a spring-pressed plunger 324 which cooperates with a flange 325 formed on the right hand end of the spool. Thus, the spool will always remain in the position to which it was last moved by one of the solenoids until the other solenoid is energized to reverse the position of the valve. Hydraulic fluid under pressure for operating the motor 257 is derived from the pressure supply line 256 which is connected through a pressure reducing valve 326 to the central pressure port of the valve 322. The end ports of the valve are connected by a line 327 and a check valve 328 to the main exhaust line 269. Intermediate ports on the valve are connected to motor lines 329 and 330 which convey fluid to and from the motor 257.

In the position of the valve 322 shown in FIG. 18a, the solenoid SOL4 has been energized to shift the spool 323 to the left thereby connecting the motor line 329 with pressure to operate the motor 257 in a direction to move the roller 154 into contact with the depth cam 140. The motor will thus continuously bias the roller into the engagement with the cam 140 during movement of the table to the left so as to effect tracing of the cam during movement of the table. When it is desired to raise the spindle carrier, the solenoid SOL3 is energized to shift the spool 323 to the right and thereby supply fluid under pressure to motor line 330 which will drive the motor in the opposite direction and remove the roller from the cam. The carrier will follow the movement of the tracer through a servomechanism hereinafter to be described.

As shown in the upper right hand corner of FIG. 18a, the tracer roller 136 of the lead tracer is maintained in engagement with the lead cam 110 by a gravity operated mechanism including a biasing weight 331 connected by a cable 332 running over pulleys 333 with the plunger 137 of the lead tracer. The roller 136 will thereby always be urged into contact with the cam 110 and will follow the surface of the cam during movement of the table in either direction.

As shown in FIG. 18b, rotation of the headstock motor 65 is controlled by an electromagnetically operated valve 340 which is similar in construction to the valve 300 previously described. The valve is fitted with a spool 341 which is operated by a moving coil 342 to which energizing current is supplied from a servoamplifier forming a part of the lead servomechanism. Fluid under pressure is supplied to the central port of the valve from pressure line 256 while the exhaust ports of the valve are connected to the exhaust line 269 as shown. The intermediate motor ports of the valve are connected to motor lines 343 and 344 which deliver fluid to and from the hydraulic motor 65 mounted on the headstock in the manner previously described.

Also shown in FIG. 18b is a solenoid operated valve 345 which controls the operation of the rack piston 182 for the indexing mechanism. The valve 345 has a spool 346 which is normally held in its right hand position by a biasing spring 347. However, when a solenoid SOL6 is energized, the spool will be shifted to the left against the urgency of the spring. Fluid under pressure is supplied to the valve from the pressure line 256 through a pressure reducing valve 348 and a pressure supply line 349. The exhaust ports of the valve are connected by lines 350 and 351 with the main exhaust line 269. The motor ports of the valve are connected by lines 352 and 353 with opposite ends of the cylinder 181 within which the rack piston operates. When the solenoid SOL6 is denergized as shown in FIG. 18b, the pressure line 349 is in communication with the motor line 352 while the motor line 353 is connected to exhaust line 351. Hence, the piston 182 is held in its left hand position with the driving pawl 205 of the indexing mechanism holding a tooth 184 of the indexing disc firmly against the end of the positioning dog 215 as shown in FIG. 14. When solenoid SOL 6 is energized, the spool 346 is shifted to the left thereby connecting the pressure line 349 with the motor line 353 to supply fluid under pressure to the left hand end of the cylinder 181. At the same time, the motor line 352 will be connected to the exhaust line 350 thereby permitting fluid to escape from the right hand end of the cylinder. Accordingly, the piston 182 will be shifted to the right to effect cocking of the indexing mechanism as previously described. After the mechanism is cocked, the solenoid is deenergized thereby causing return movement of the piston 182 to the left to effect indexing of the headstock spindles through the lead servomechanism as will hereinafter be described.

*Electric Controls and Operation*

In FIGS. 20 and 22 are shown block diagrams of the servomechanism utilized for controlling the spindle carrier and headstock spindles under the control of the depth tracer and lead tracer, respectively. As shown in FIG. 20, the depth cam 140 drives a synchro transmitter CX through the depth tracer which is adapted to follow the contour of the cam. The synchro transmitter is energized with 400 cycle A.C. from an oscillator 365 which also delivers current to a depth servoamplifier 366 for phase comparison purposes. The signal from the synchro transmitter CX is passed through a synchro differential transmitter CDX to a receiver or control transformer CT which is mechanically driven from the spindle carrier 36. Any discrepancy between the position of the control transformer and that of the synchro transmitter results in an error signal which is delivered to the depth servoamplifier 366 which compares the phase of the signal with the voltage from the 400 cycle oscillator and converts it into a D.C. output signal which is either positive or negative in accordance with the phase of the error signal. The output from the servoamplifier is used to energize the moving coil valve 300 which in turn controls the operation of the hydraulic cylinder motor 37 for the spindle carrier 36. The spindle carrier is thereby caused to follow the movements of the depth tracer as the latter is translated by the depth cam 140.

The servo control for the headstock spindles is shown in the bottom portion of FIG. 20 and is similar to the depth servo mechanism just described. Briefly, the lead cam 110 drives a synchro transmitter CX which is associated with the lead tracer and the signal from the transmitter is passed through a synchro differential transmitter CDX to a receiver or control transformer CT. The error signal from the control transformer is amplified and rectified by the servoamplifier 367 and applied to the moving coil valve 340 which controls the hydraulic motor 65 for the headstock 50.

The connections of the synchros are shown schematically in FIG. 22, the depth control synchros being shown in the upper part of the figures and the lead control synchros being shown in the bottom part thereof. It will be noted that a coarse-fine synchro system is utilized in both cases to provide the high degree of accuracy required in the positioning of the spindle carrier and the headstock spindles. The depth control system includes a fine synchro transmitter CX–1 which, as diagrammatically illustrated in FIG. 18a is driven by the plunger 155 of the depth tracer through a ball-nut and screw mechanism 368 which is geared to the rotor of the synchro transmitter CX–1. The rotor of the coarse synchro CX–2 is driven from the rotor of the fine synchro through reduction gearing 369.

As indicated in FIG. 22 the stators of the synchro transmitters are connected to the stators of fine and coarse synchro differential transmitters CDX–1 and CDX–2, the rotors of which are adapted to be turned by a hand wheel 370. A gear reduction drive corresponding to the gear reduction 369 is provided between the fine and coarse synchro differential transmitters. The differential synchros and the hand wheel 370 may, for convenience, be mounted in the upper part of the housing 240 which contains the indexing mechanism as shown in FIGS. 1 and 2.

The rotors of the differential synchros are electrically connected to the stators of control transformers CT–1 and CT–2 which are contained in a housing 371 (FIG. 2) mounted on the bed of the machine adjacent the carrier 36. Referring to FIG. 18a, it will be seen that the control transformers are driven from the carrier by a ball-nut and screw mechanism 372 with a gear reduction drive 373 interposed between the transformers to cause them to rotate in the same speed ratio as the synchro transmitters and synchro differentials. Error signals from the control transformers are fed to a synchro switching unit 374 which delivers the error signal from either the fine transformer CT–1 or the coarse transformer CT–2 to the depth servo amplifier 366 depending upon the magnitude of the error signal. The output from the servo-amplifier is then applied to the moving coil 303 of the servovalve 300 as previously described in connection with FIG. 20. The hand adjustment provided by the hand wheel 370 enables the spindle carrier to be adjusted up or down independently of the control exerted by the depth tracer for initial positioning of the cutters relative to the workpieces.

The synchro system utilized in connection with the lead tracer is of a similar nature and includes a fine synchro transmitter CX–3 and coarse synchro transmitter CX–4 the rotors of which are driven by a ball-nut and screw mechanism 375 (FIG. 18a) with a suitable gear reduction 376 provided between the rotors of the fine and coarse transmitters.

As shown in FIG. 22, the stators of the transmitters are connected to the stators of fine and coarse synchro differential transmitters CDX–3 and CDX–4 which are contained in the housing 240 with the indexing mechanism. The rotors of CDX–3 and CDX–4 are driven by the indexing mechanism through the gear 225 (FIG. 18b) with a suitable gear reduction drive 377 interposed between the fine and coarse units. The rotors of the synchro differential transmitters are electrically connected to the stators of the control transformers CT–3 and CT–4 which, as shown in FIGS. 8 and 18b are driven from the motor 65 through gearing 378 with a gear reduction drive 379 interposed between the fine and coarse transformers. Referring again to FIG. 22, the error signals from the control transformers are led into a synchro switching unit 380 which selects the signal from one or the other of the transformers for transmittal to the lead servoamplifier 367. Here the error signal is rectified and amplified and delivered to the moving coil 342 of the servovalve 340 for the headstock motor 65. It will thus be seen that the headstock spindles will be rotated in accordance with the movement of the lead tracer by the lead cam 110 but that independent movement of the headstock spindles may be introduced by the indexing mechanism to advance the workpieces at the end of each cut to position them for the next flute to be machined. Additionally, the headstock spindles may be adjusted by the hand knob 229 in order to rotate the headstock spindles to the correct starting position at the commencement of the machining cycle.

*Operating Cycle*

In order to illustrate the operation of the machine, it will be assumed that a spiral reamer or similar piece of work is to be formed by milling a series of spiral flutes in a cylindrical workpiece. The unfinished workpieces 52 are mounted between the headstock spindles and the tailstock centers as shown in FIGS. 2 and 3 with the table in its loading position, i.e., all the way to the right as viewed in FIGS. 2 and 18a. The carrier is in its raised position with limit switch 3LS held operated by a dog 398 (FIG. 18a) mounted on the carrier. The machine operation, which is diagrammatically illustrated in FIG. 21 is commenced by depressing push buttons 390 and 391 (FIG. 19) which are mounted in a push button control station 392 mounted on the outboard brace 241 as shown in FIG. 1. Depression of push button 390 energizes solenoid SOL2 from power lines 386 and 387 which are energized from a transformer 388. This shifts the spool 262 (FIG. 18a) of the pilot valve 260 to the right thereby causing the spool 270 of the reversing valve 261 also to be moved to the right. Hydraulic fluid is thereby directed to the table motor 34 to cause the table to be moved to the left. Depression of push button 391 energizes relay 9CR in line 5 of the wiring diagram (FIG. 19). Energization of this relay causes its contacts in line 15 to be closed thereby energizing solenoid SOL5 which, as shown in FIG. 18a, shifts the spool 291 of the rapid traverse valve 290 to the right to adjust the high speed-low speed valve 280 for high speed operation of the motor 34 and to also shift the bypass valve 293 to the left to bypass the rate valve 277. The table will now move in rapid traverse to the left as long as the push buttons 390 and 391 are held depressed. As the table approaches the left hand limit of its travel as defined by the approach of a dog 393 carried thereby, into the proximity of limit switch 4LS, the push button 391 is released to slow the table to a feed rate. The dog 393 thereafter strikes the plunger of limit switch 4LS which deenergizes solenoid SOL2 and stops table movement to the left. The operator then releases push button 390 and depresses a push button 394 which energizes solenoid SOL4 and shifts the spool 323 of the valve 322 (FIG. 18a) to the left to the position shown in FIG. 18a. This causes the motor 257 to move the plunger 155 of the depth tracer toward the depth cam 140. The depth servomechanism thereby causes the carrier to move down rapidly until the dog 310 operates the bypass valve 307 to reduce the carrier movement to a feed rate. The lower limit of travel of the carrier is determined by the engagement of the depth tracer with the cam 140 when the depth servomechanism will stop the carrier in the position determined by the cam. The valve 322 will remain in its shifted position after push button 394 is released due to the detent 324 which holds the spool 323 to the left as shown in FIG. 18a. The motor 257 will thereby remain energized to hold the roller 154 in contact with the cam 140.

The operator now depresses a push button 395 (line 3) which energizes solenoid SOL1 and shifts the plunger 262 of pilot valve 260 to the left to cause corresponding movement of the plunger 270 of valve 261. Thereby the motor 34 will drive the table to the right at a feed rate. As the table moves to the right, the first flute will be cut in each of the workpieces with the cams 140 and 110 controlling the taper of the flutes and the rotation of the headstock spindles as the table moves the workpieces beneath the cutters. When the cut is finished, a dog 396 will operate limit switch 2LS (line 4) thereby deenergizing solenoid SOL1 and stopping the table. A push button 397 is then depressed to energize solenoid SOL3 which shifts spool 323 of valve 322 to the right (FIG. 18a) where it is held by detent 324. The motor 257 will now be reversed and move the plunger 155 of the depth tracer away from the cam 140 to raise the spindle carrier and remove the cutters from the work. As the carrier approaches the limit of its upward movement which is determined, for example, by a mechanical stop for the plunger 155 of the depth tracer, the dog 398 on the spindle carrier will engage limit switch 3LS and deenergize solenoid SOL3.

The carrier and table are now in their starting positions ready for the next operation.

The operator now depresses the manual index push button 400 which energizes a relay 24CR (line 9) and closes the 24CR contacts shown in lines 8, 9, 10, and 12 of the wiring diagram. The 24CR contacts in line 8 will complete a circuit through a relay 6CR thereby energizing this relay and closing its contacts in line 14 to energize solenoid SOL6. The valve 345 (FIG. 18b) will thereby be shifted to the left and cause the rack piston 182 to move to the right and cock the index mechanism. At the beginning of the cocking stroke, pawl 215 (FIG. 16) is elevated by the mask 217 and operates limit 5LS. Hence, the contacts 5LS in line 12 will be closed to energize relay 26CR and contacts 5LS in line 13 will be opened. The contacts 26CR in line 13 will close so as to establish a holding circuit for relay 26CR around the normally open contacts of limit switch 5LS in line 12.

At the end of the cocking stroke, the stop plate 187 (FIG. 5) is rocked counterclockwise to operate limit 6LS. Thereupon, the contacts 6LS in line 9 will open and the contacts 6LS in line 10 will close to energize relay 25CR. This relay will be latched in by its contacts in line 11 and relay 6CR will be deenergized by opening of the normally closed contacts 25CR in line 8. Solenoid 6SOL will thereupon be deenergized and the valve plunger 346 (FIG. 18b) will be spring returned and cause the rack piston 182 to return to its starting position. Limit switch 6LS will be released and the driving pawl 205 (FIG. 14) will turn the notched disc 183 clockwise until the positioning pawl 215 reenters the notch in the mask. Thereupon, the disc will be stopped and the limit switch 5LS will be released. The contacts 5LS in line 13 will close and energize relay 27CR. The normally closed contacts of this relay in line 9 will open thereby deenergizing relay 24CR. The opening of the 24CR contacts in lines 10 and 12 causes relays 25CR, 26CR, and 27CR to be deenergized thus completing the indexing cycle. As a result of the indexing operation, the headstock spindles will be rotated to an extent corresponding to the rotation of the notched disc 183 and the work will now be in position for the milling of the next flute. The operation of the table and carrier push buttons in the sequence previously described may then be repeated so as to effect milling of the next flute in each of the workpieces. The headstock spindles are then again indexed by depression of push button 400 and the operations repeated as many times as necessary in order to complete the milling of all of the flutes in the workpieces.

Although the invention has been described in connection with one possible form or embodiment thereof, and certain specific terms and language have been used herein, it is to be understood that the disclosure is illustrative rather than restrictive and that changes and modifications may be resorted to without departing from the spirit of the invention as defined by the claims which follow.

What is claimed is:

1. In a machine for producing longitudinally extending spiral flutes in a piece of work, said machine having a cutting tool, a spindle for supporting said tool, a work supporting spindle, and means for effecting axial movement of said work supporting spindle relative to said tool supporting spindle, the combination of a first servomechanism including a tracer and a servomotor controlled thereby for rotating said work supporting spindle, a second servomechanism including a tracer and a servomotor controlled thereby for moving said tool supporting spindle toward and from the axis of said work supporting spindle, a cam associated with each of said tracers for controlling the operation of its associated servomotor, and means for moving each cam relative to its associated tracer and in synchronism with the axial movement of said work supporting spindle effected by said moving means to thereby correlate the depth of cut effected by said cutting tool with the rotational position of the work as the latter is moved in the direction of its longitudinal axis by said moving means.

2. In a machine for producing longitudinally extending spiral flutes in a piece of work, said machine having a cutting tool, a spindle for supporting said tool, a reciprocable table, a work supporting spindle mounted on said table with its axis parallel to the direction of movement of the table, and power operated means for moving said table, the combination of a first servomechanism including a tracer and a servomotor controlled thereby for rotating said work supporting spindle, a second servomechanism including a tracer and a servomotor controlled thereby for moving said tool supporting spindle toward and from the axis of said work supporting spindle, a cam associated with each of said tracers for controlling the operation of its associated servomotor, and means for mounting each of said cams on said table for movement therewith and relative to its associated tracer to thereby correlate the depth of cut effected by said cutting tool with the rotational position of the work as the latter is moved in the direction of its longitudinal axis by said power operated means.

3. In a machine for producing longitudinally extending spiral flutes in a piece of work, said machine having a bed, a saddle supported for swiveling movement on said bed, a table mounted for longitudinal sliding movement on said saddle, a work supporting spindle mounted on said table with its axis parallel to the direction of movement of the table, power operated means for moving said table on said saddle, a cutting tool, and a spindle carrier for supporting said tool on said bed for movement toward and from the axis of said work supporting spindle, the combination of a first servomechanism including a tracer on said saddle and a servomotor on said table for rotating said work supporting spindle, a second servomechanism including a tracer on said saddle and a servomotor on said bed for moving said spindle carrier relative to said table, a cam associated with each of said tracers for controlling the operation of its associated servomotor, and means for mounting each of said cams on said table for cooperation with its associated tracer to thereby correlate the depth of cut effected by said cutting tool with the rotational position of the work as the latter is moved in the direction of its longitudinal axis by said power operated means.

4. The machine of claim 1 wherein each of said cams is arranged for adjustment as to the amount to throw effected thereby, said machine including a separate mechanism for adjusting the throw of each of said cams, and a graduated dial driven by each of said mechanisms, one of said dials indicating the rate of rotation of the workpiece relative to the axial movement thereof, and the other of said dials indicating the rate at which the depth of cut changes in response to axial movement of the workpiece.

5. The machine of claim 4 wherein each of said cams is in the form of a lever which is adjustable about its pivot to provide varying amounts of throw to its associated tracer.

6. The machine of claim 4 wherein one of said dials is calibrated to read in inches of lead per revolution, and the other of said dials is calibrated to read in degrees of taper.

7. In a machine for producing a predetermined number of longitudinally extending spiral flutes spaced around a periphery of a workpiece, said machine having a slide, a support for said slide, means including a spindle on said slide for supporting the workpiece for rotation about its longitudinal axis, a cutting tool for cutting a flute in said workpiece, and means for traversing said slide on said support, the combination of a servomechanism for effecting rotation of said spindle including a tracer and a servomotor uncontrolled thereby, a cam cooperating with said tracer, said cam and said tracer being mounted on said support and said slide for relative movement therebetween, a synchro transmitter driven by said tracer, a synchro receiver driven by said servomotor, a synchro differential interposed between said synchro transmitter and said synchro receiver for adjusting the position of said spindle independently of said tracer, and indexing means for selectively rotating said synchro differential through a predetermined distance to thereby advance the workpiece from one flute to the next.

8. The machine of claim 7 wherein said indexing means includes a notched disc, an advancing pawl for rotating said disc through a preselected angle, and hydraulically actuated means for operating said advancing pawl.

9. The machine of claim 7 including manipulative means for rotating said synchro differential independently of said indexing means to enable said spindle to be adjusted to a preselected starting position.

References Cited in the file of this patent

UNITED STATES PATENTS

| | | |
|---|---|---|
| 1,278,867 | Daneke | Sept. 17, 1918 |
| 1,630,716 | Pierce | May 31, 1927 |
| 1,774,692 | Armitage | Sept. 2, 1930 |
| 1,972,818 | Romaine et al. | Sept. 4, 1934 |
| 2,330,921 | Rickenmann | Oct. 5, 1943 |
| 2,416,539 | Nenninger et al. | Feb. 25, 1947 |
| 2,449,179 | Scharping | Sept. 14, 1948 |
| 2,597,648 | Lucas | May 20, 1952 |
| 2,660,931 | De Vlieg | Dec. 1, 1953 |
| 2,734,427 | Goodwin | Feb. 14, 1956 |

FOREIGN PATENTS

| | | |
|---|---|---|
| 675,682 | Great Britain | July 16, 1952 |

UNITED STATES PATENT OFFICE
CERTIFICATE OF CORRECTION

Patent No. 3,101,649                                 August 27, 1963

Robert W. Nashold et al.

It is hereby certified that error appears in the above numbered patent requiring correction and that the said Letters Patent should read as corrected below.

Column 16, line 71, for "uncontrolled" read -- controlled --.

Signed and sealed this 25th day of February 1964.

(SEAL)
Attest:

ERNEST W. SWIDER                         EDWIN L. REYNOLDS

Attesting Officer                           Acting Commissioner of Patents